(12) United States Patent
Baloul

(10) Patent No.: US 11,232,363 B2
(45) Date of Patent: Jan. 25, 2022

(54) SYSTEM AND METHOD OF PROVIDING NEWS ANALYSIS USING ARTIFICIAL INTELLIGENCE

(71) Applicant: Jacov Jackie Baloul, Weston, FL (US)

(72) Inventor: Jacov Jackie Baloul, Weston, FL (US)

(*) Notice: Subject to any disclaimer, the term of this patent is extended or adjusted under 35 U.S.C. 154(b) by 443 days.

(21) Appl. No.: 16/113,181

(22) Filed: Aug. 27, 2018

(65) Prior Publication Data

US 2019/0065965 A1  Feb. 28, 2019

Related U.S. Application Data

(60) Provisional application No. 62/551,276, filed on Aug. 29, 2017.

(51) Int. Cl.
| | |
|---|---|
| *G06N 5/02* | (2006.01) |
| *G06Q 50/00* | (2012.01) |
| *G06F 3/16* | (2006.01) |
| *G10L 15/22* | (2006.01) |
| *G06F 3/0484* | (2013.01) |
| *G06F 40/30* | (2020.01) |
| *G06F 40/284* | (2020.01) |

(52) U.S. Cl.
CPC ............ *G06N 5/022* (2013.01); *G06F 3/167* (2013.01); *G06F 40/284* (2020.01); *G06F 40/30* (2020.01); *G06Q 50/01* (2013.01); *G10L 15/22* (2013.01); *G06F 3/0484* (2013.01); *G10L 2015/223* (2013.01)

(58) Field of Classification Search
None
See application file for complete search history.

(56) References Cited

U.S. PATENT DOCUMENTS

| | | | |
|---|---|---|---|
| 6,751,776 B1 | 6/2004 | Gong | |
| 8,463,595 B1* | 6/2013 | Rehling | G06Q 30/02 704/9 |
| 8,838,614 B2 | 9/2014 | Koperda et al. | |
| RE46,902 E * | 6/2018 | Kursun | G06F 40/134 |

(Continued)

OTHER PUBLICATIONS

Godbole et al., "Large-Scale Sentiment Analysis for News and Blogs," International AAAI Conference on Web and Social Media (ICWSM) 2007, Boulder, Colorado, USA.*

(Continued)

*Primary Examiner* — Ryan Barrett
(74) *Attorney, Agent, or Firm* — Dunlap Bennett & Ludwig, PLLC; Brendan E. Squire

(57) ABSTRACT

A system of providing news analysis. The system includes a computing system including a processor, a memory, a user interface, a communications interface, and word data stored on the memory. The word data includes a plurality of words each linked with a sentiment score. A software program causes the processor to: retrieve news data from a plurality of information sources; tally an amount of times that each of the plurality words are referenced within the news data; calculate a live sentiment score of each of the words by averaging the sentiment score of a respective word with the sentiment scores of other of the plurality of words within a same sentence; and presents at least one of the words having a highest number of the amount of times referenced. The chosen word is presented with a respective live sentiment score.

15 Claims, 5 Drawing Sheets

(56) References Cited

U.S. PATENT DOCUMENTS

| | | | |
|---|---|---|---|
| 2009/0235150 | A1 | 9/2009 | Berry |
| 2009/0292677 | A1 | 11/2009 | Kim |
| 2009/0319342 | A1* | 12/2009 | Shilman .................. G06Q 30/02 705/7.41 |
| 2010/0121707 | A1 | 5/2010 | Goeldi |
| 2011/0078167 | A1* | 3/2011 | Sundaresan ............. G06F 40/30 707/765 |
| 2013/0124191 | A1* | 5/2013 | Louis .................... G06F 16/355 704/9 |
| 2013/0138577 | A1 | 5/2013 | Sisk |
| 2013/0159340 | A1 | 6/2013 | Blanco et al. |
| 2014/0032657 | A1 | 1/2014 | Johnmar |
| 2014/0279622 | A1 | 9/2014 | Lamoureux et al. |
| 2015/0058344 | A1* | 2/2015 | Bhatia ................... G06F 16/285 707/737 |
| 2015/0089409 | A1 | 3/2015 | Asseily et al. |
| 2015/0220940 | A1 | 8/2015 | Tuteja et al. |
| 2015/0286627 | A1* | 10/2015 | Chang .................. G06F 40/205 704/9 |
| 2015/0294220 | A1 | 10/2015 | Oreif |
| 2016/0100020 | A1* | 4/2016 | Rosenblum ............. H04L 67/24 709/218 |
| 2016/0125462 | A1 | 5/2016 | Mallah et al. |
| 2016/0170993 | A1 | 6/2016 | Katz et al. |
| 2016/0217130 | A1* | 7/2016 | Moilanen ............. G06F 40/211 |
| 2016/0261701 | A1 | 9/2016 | Dhawan et al. |
| 2016/0314477 | A1 | 10/2016 | Ha |
| 2016/0364652 | A1* | 12/2016 | Fei ...................... G06Q 30/0282 |
| 2017/0193397 | A1* | 7/2017 | Kottha .................. G06F 16/358 |
| 2017/0195125 | A1* | 7/2017 | Heppe ................... H04L 9/3247 |
| 2017/0208025 | A1 | 7/2017 | Chakra et al. |
| 2017/0220578 | A1* | 8/2017 | Kazi ....................... G06F 40/30 |
| 2017/0249389 | A1 | 8/2017 | Brovinsky et al. |
| 2017/0270099 | A1* | 9/2017 | Gorny .................... G06Q 30/01 |
| 2018/0032898 | A1* | 2/2018 | Wu ........................ G06N 20/00 |
| 2018/0053114 | A1 | 2/2018 | Adjaoute |
| 2018/0060338 | A1* | 3/2018 | DeLuca ............. G06F 16/9535 |

OTHER PUBLICATIONS

Brandwatch, "How to Conduct Sentiment Analysis #brandwatchtips," Sep. 11, 2014, https://www.brandwatch.com/blog/conduct-sentiment-analysis-brandwatchtips/.*

Graham-Smith, "Amazon Echo: the first 13 things to try," Nov. 13, 2016, https://www.theguardian.com/technology/2016/nov/13/amazon-echo-alexa-first-things-to-try.*

Buzzwords, "Top 10 Buzzwords Today," Jul. 24, 2017, https://web.archive.org/web/20170724005843/https://www.buzzwords.news/.*

Godbole et al., "Large Scale Sentiment Analysis for News and Blogs," Jan. 2007, Proceedings of the International Conference on Weblogs and Social Media, https://pdodds.w3.uvm.edu/files/papers/others/2007/godbole2007a.pdf.*

* cited by examiner

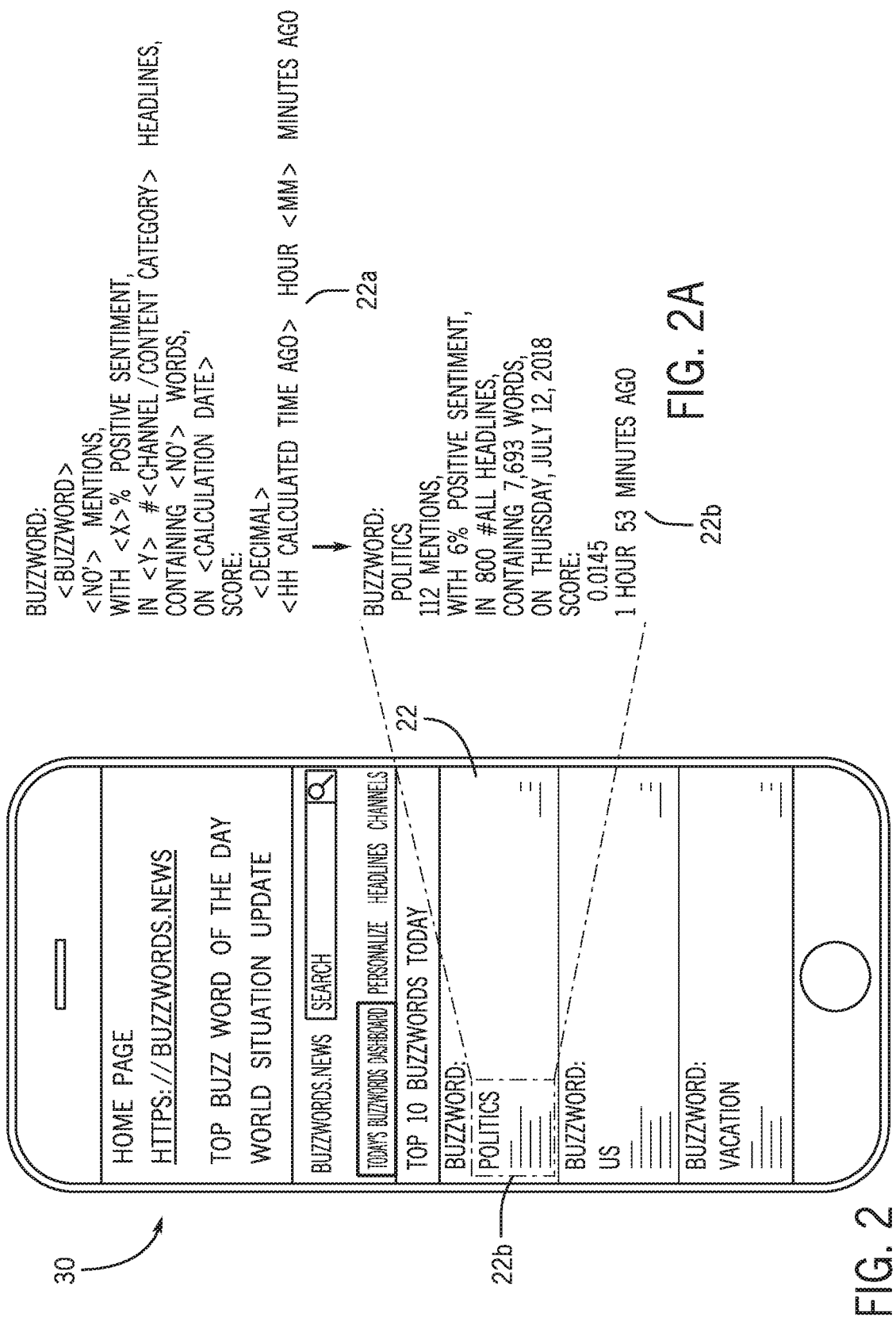

SYSTEM AND METHOD OF PROVIDING NEWS ANALYSIS USING ARTIFICIAL INTELLIGENCE

CROSS-REFERENCE TO RELATED APPLICATION

This application claims the benefit of priority of U.S. provisional application No. 62/551,276, filed Aug. 29, 2017, the contents of which are herein incorporated by reference.

BACKGROUND OF THE INVENTION

The present invention relates to a system and method of providing news analysis using artificial intelligence.

Currently, due to the Internet, there is an information overload and addiction in today's digital world. Too many people waste too much time scrolling through infinite amounts of information scattered across infinite scroll news feeds and social media to gather their perspective on the situation in the world. Additionally, it is difficult to measure media bias, on a channel by channel level.

The challenge in Big Data & natural language processing (NLP) programming is multiple fold: 1) aggregating, parsing, classifying, organizing, and storing vast amounts of information from many sources is difficult; 2) analyzing large amounts of data sets at high frequency is not trivial; 3) today, this type of information, must be gathered and compiled manually from multiple sources; and 4) the interface of existing systems require typing information manually into the computer.

As can be seen, there is a need for an improved system and method of providing news analysis using artificial intelligence.

SUMMARY OF THE INVENTION

In one aspect of the present invention, a system of providing news analysis comprises: a computing system comprising a processor, a memory, a user interface, a communications interface, and word data stored on the memory, the word data comprising a plurality of words each comprising a sentiment score, wherein the processor: retrieves news data from a plurality of information sources over a network via the communications interface; tallies an amount of times that each of the plurality words are referenced within the news data; calculates a live sentiment score of each of the words by averaging the sentiment score of a respective word with the sentiment scores of other of the plurality of words within a same sentence; and presents at least one of the plurality of words comprising a highest number of the amount of times referenced, wherein the at least one of the plurality of words is presented with a respective live sentiment score.

In another aspect of the present invention, a method of providing news analysis comprising steps of: retrieving, via software running on a computing system, news data from a plurality of information sources over a network; tallying, via the software running on the computing system, an amount of times that each of the plurality words are referenced within the news data; calculating, via software running on the computing system, a live sentiment score of each of the plurality words by: accessing word data comprising a plurality of words each comprising a sentiment score, and averaging the sentiment score of a respective word with the sentiment scores of other of the plurality of words within a same sentence; and presenting, via software running on the computing system, at least one of the plurality of words comprising a highest number of the amount of times referenced, wherein the at least one of the plurality of words is presented with a respective live sentiment score.

These and other features, aspects and advantages of the present invention will become better understood with reference to the following drawings, description and claims.

BRIEF DESCRIPTION OF THE DRAWINGS

FIG. 2 is a first screenshot of an embodiment of the present invention;

FIG. 2A is an illustration of calculation variables of an embodiment of the present invention;

DETAILED DESCRIPTION OF THE INVENTION

Figure 1:
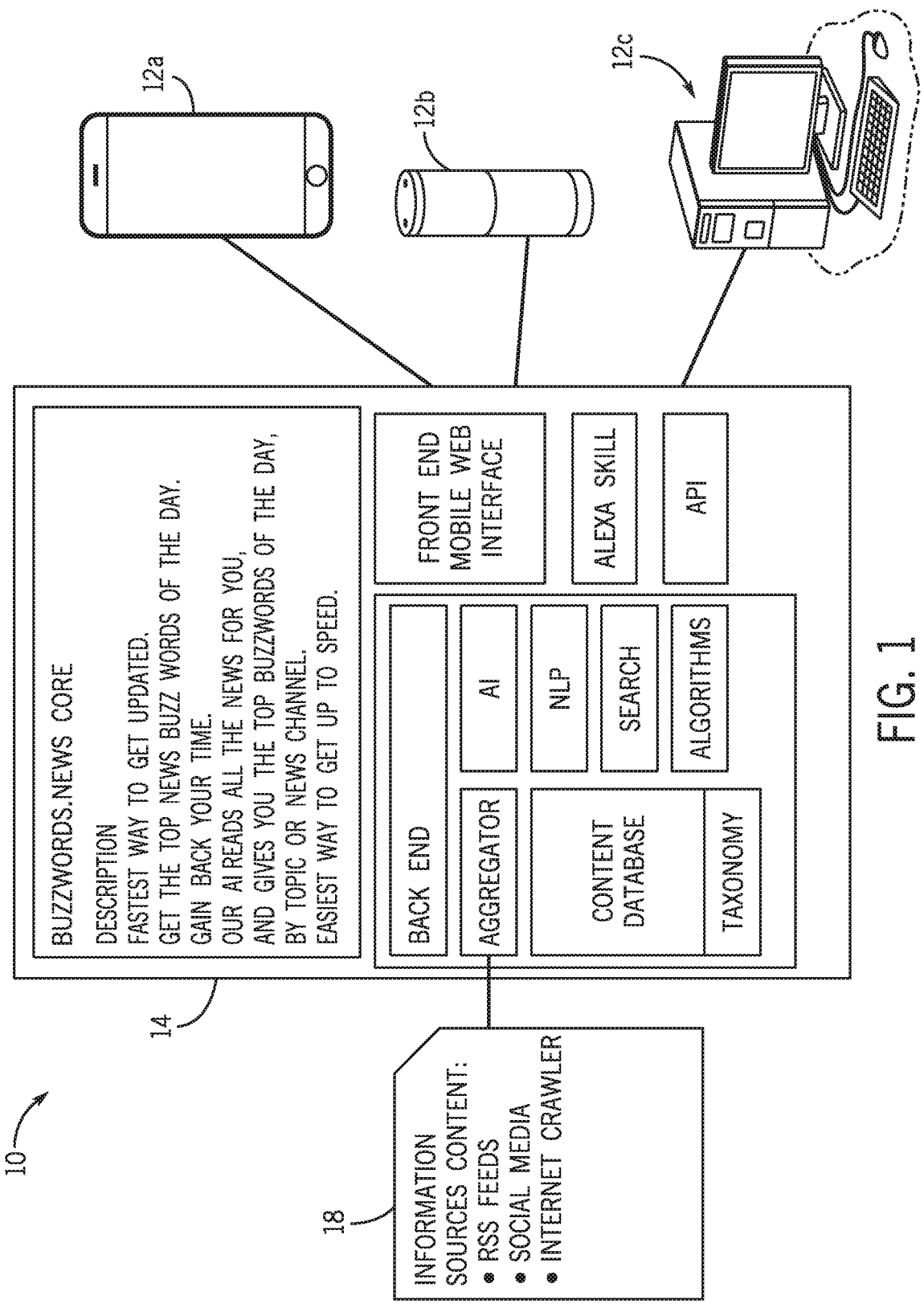
FIG. 1 is a schematic diagram of an architecture of an embodiment of the present invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes a cloud computing software (Web and Mobile Application, AMAZON ALEXA SKILL®, custom artificial intelligence (AI) plus natural language processing (NLP) plus algorithms) that aggregates, organizes and analyzes online content to calculate and score top trending key words (aka Buzz Words) and derive "The Situation of the World", percent Positive ||Negative|| Neutral, based on artificial intelligence that can understand and associate, sentiment analysis; classifying (taxonomy tagging) related words and headlines Channels.

The elements comprised are components of a decoupled architecture, where each component can provide an application programming interface (API) to another component, allowing integration at any point by other computer systems that want to consume the same content, scores, calculations and results. In other words, the API can power any number of AI personal assistants as well as deliver the same information as a whole or in parts under the same or different web sites, brands or interfaces. For example, "The Situation of the World" calculation can be delivered separately under different branding or web site domains. Similarly, the following permutations of the following calculations can be delivered separately under a different domain labeling, "Buzz Word of the Day", "Buzz Word in Sports", "Buzz Words in Technology", "Trending Words in Politics", "Trending Words in Business Today", etc.

To use the software, the user can: a) say "Alexa, ask Buzz Words", to their AMAZON ECHO™, FIRE™, or DOT™; or b) browse to https://buzzwords.news to visualize the information. The present invention can be used as a tool within the following fields of study: Measuring Social Economic Patterns; Social Media Behavioral Analysis; Measure Global Positions to derive Strategic and Tactical conclusions using Geographical and Regional Content Sentiment Analysis; Predict Peace and War; and measure the world's harmony. The AI of the present invention can produce a higher-level intelligence to expand and deepen it's understanding as well as enhance or create robotic personal assistants.

The present invention includes an AI that reads all the news and provides a situation update. The AI does the heavy lifting, by gathering and reading all the content, and summarizes what is being discussed (top trending key words) in news channels, and what is the sentiment of the related content. The NLP within the AI can understand and measure impact of words on headlines, news cycles, markets and the buzz word positivity sentiment analysis based on content categorization by news channel and topic.

The present invention, in the back end, utilizes latest and greatest cutting-edge cloud computing architecture, to decouple the different computer systems required to derive the calculations presented allowing for rapid and more accurate processing of large data sets at scale while also auto scaling the decoupled components to provide elasticity within the computing engine. In the front end, the improvement comes by way of interface simplicity. 1) The user can ask the computer device for the result using a voice interface, and the results are spoken back to the user by the robot (AMAZON ALEXA SKILL™). 2) the user can visualize the data on the mobile web application (https://buzzwords.news). 3) The user can personalize their perspective by sorting and filtering the data.

Figure 4:
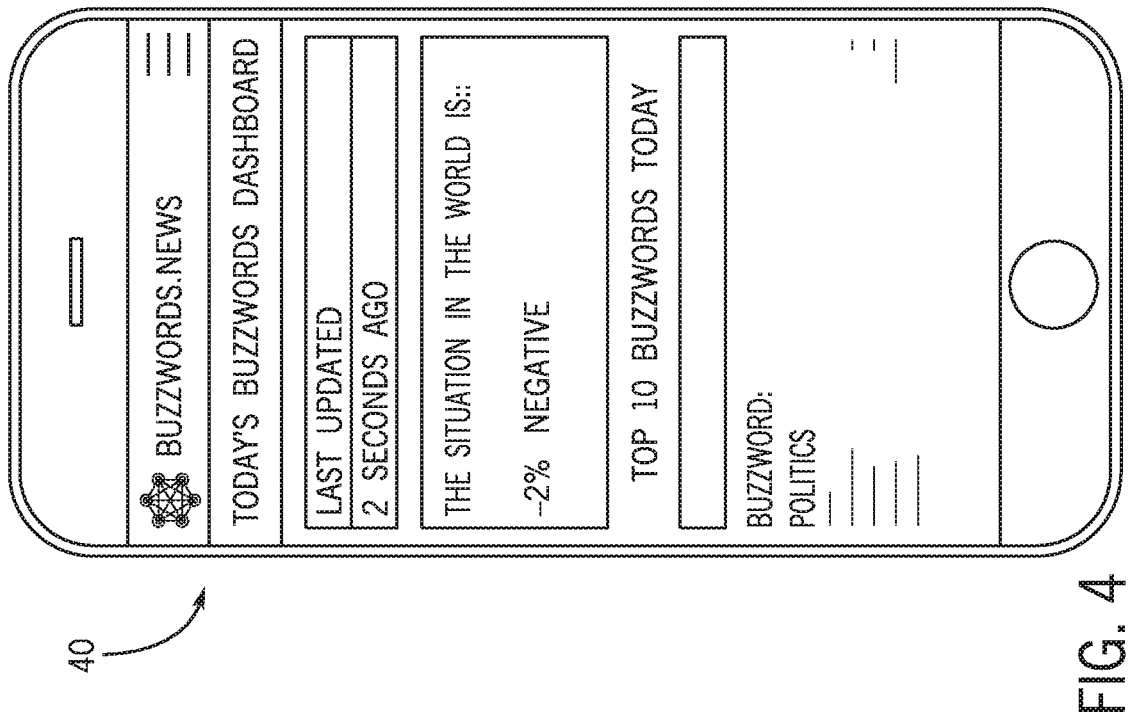
FIG. 4 is a third screenshot of an embodiment of the present invention.
Figure 3:
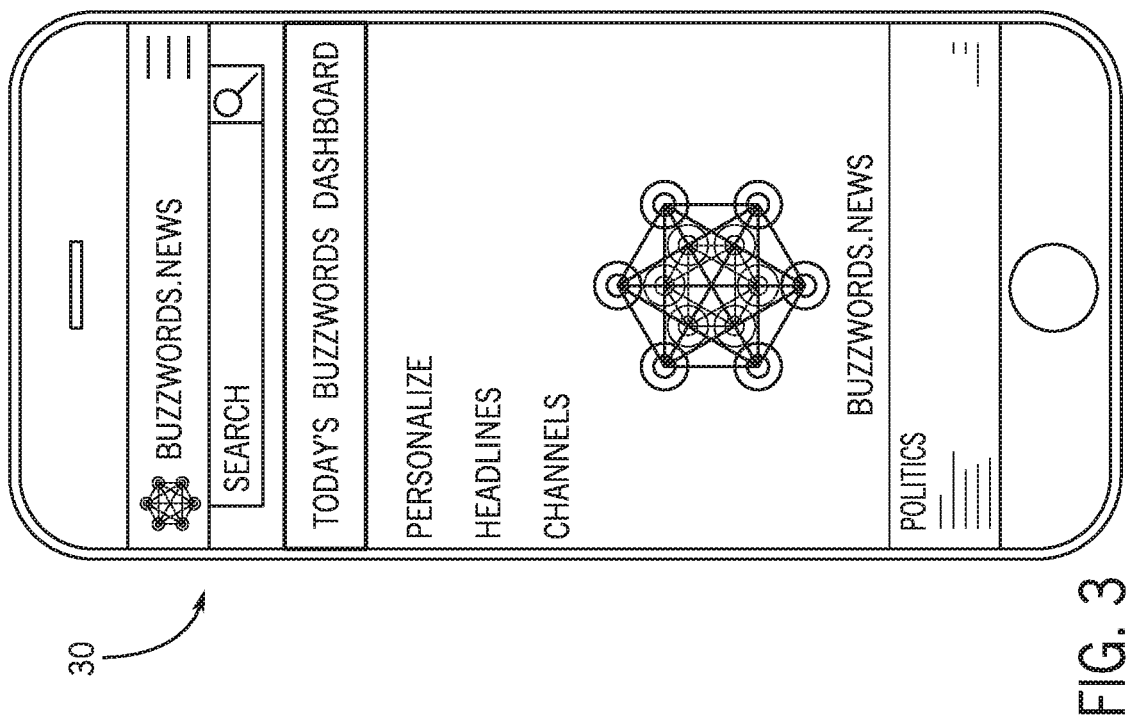
FIG. 3 is a second screenshot of an embodiment of the present invention.
Figure 6:
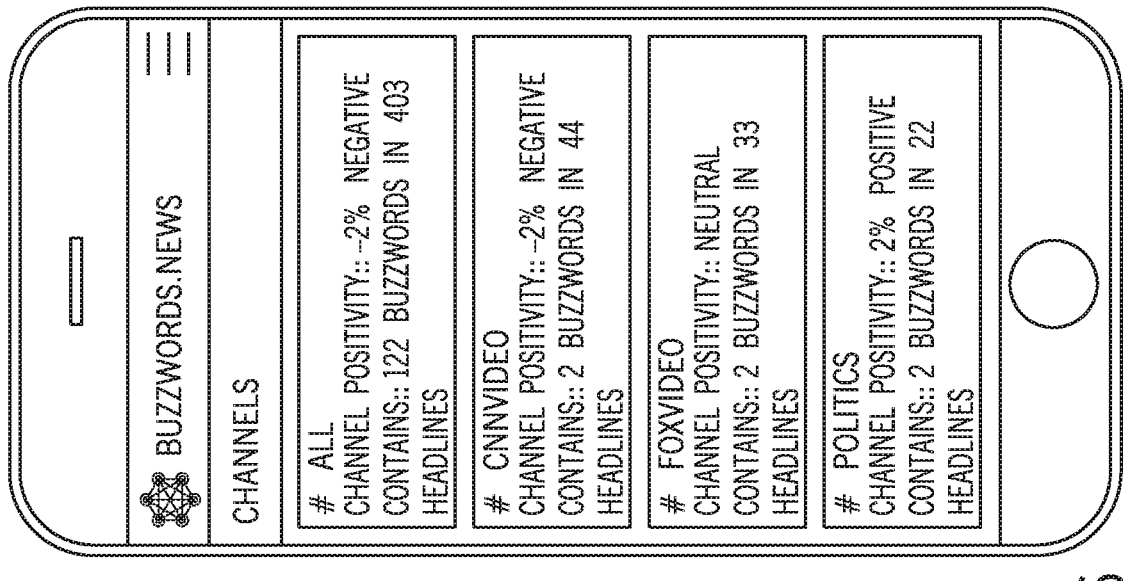
FIG. 6 is a fifth screenshot of an embodiment of the present invention.
Figure 5:
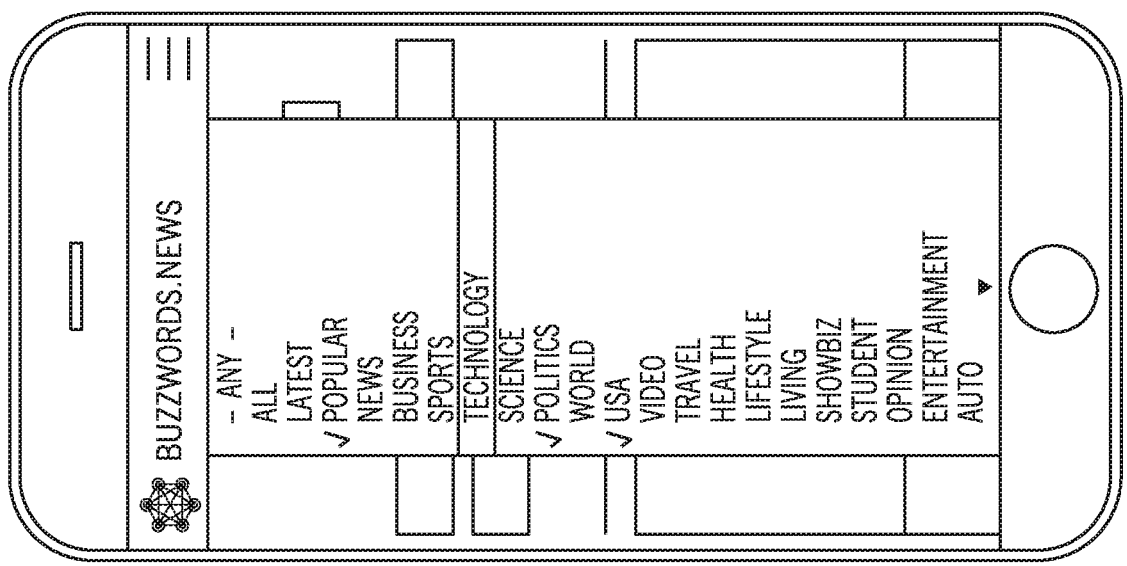
FIG. 5 is a fourth screenshot of an embodiment of the present invention.
Figure 7:
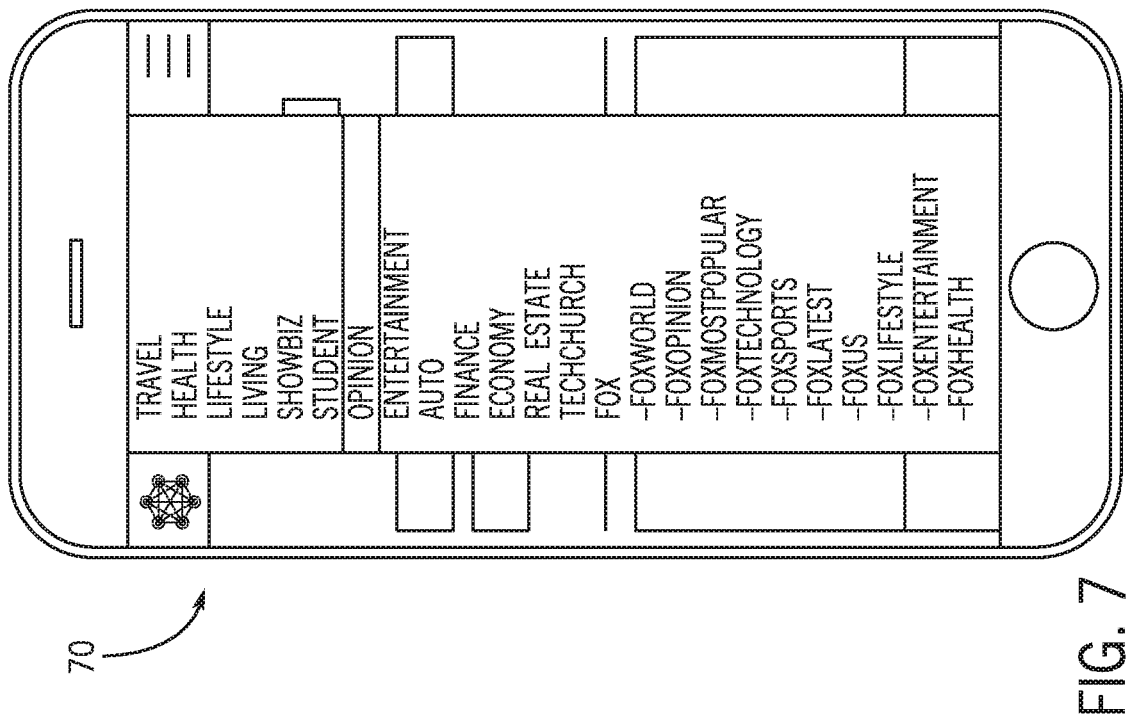
FIG. 7 is a sixth screenshot of an embodiment of the present invention.

Referring to FIGS. 1 through 7, the present invention includes a system 10 of providing news analysis. The system 10 includes a computing system 12 including a processor, a memory, a user interface, a communications interface, and word data stored on the memory. The word data includes a plurality of words each linked with a sentiment score. A software program 14 causes the processor to retrieve news data from a plurality of information sources 18 over a network via the communications interface. The computing system 12 tallies an amount of times that each of the plurality words are referenced within the news data. The computing system calculates a live sentiment score of each of the words by averaging the sentiment score of a respective word with the sentiment scores of other of the plurality of words within a same sentence. The computing system then presents at least one of the words having a highest number of the amount of times referenced. The chosen word is presented with a respective live sentiment score.

The sentiment score may be a positive or negative number based on the meaning of the word. For example, words such as love, explore, peace, prosperity, energy, life, and the like have a positive score and words such as poverty, death, murder, genocide, famine, war and the like have negative scores.

In certain embodiments, the news data is a plurality of article titles retrieved from the plurality of information sources 18. The same sentence is the article title in which the word is extracted from. Alternatively, the entire articles can be retrieved.

The present invention includes a software 14 running on a computing system 12. The computing system 12 may include a desktop 12c, a laptop, a server, a smart device 12a (smart phone and tablet computer), virtual assistant device 12b, or a combination thereof. The computing system 12 is at least the processor and the memory. The computing system 12 may execute on any suitable operating system such as IBM's Z Series/Operating System (Z/OS), MS-DOS, PC-DOS, MAC-iOS, WINDOWS, UNIX, OpenVMS, ANDROID, an operating system based on LINUX, or any other appropriate operating system, including future operating systems.

In particular embodiments, the computing system 12 includes a processor, memory, a user interface, and a communication interface. In particular embodiments, the processor includes hardware for executing instructions, such as those making up a computer program. The memory includes main memory for storing instructions such as computer program(s) for the processor to execute, or data for processor to operate on. The memory may include an HDD, a floppy disk drive, flash memory, an optical disc, a magneto-optical disc, magnetic tape, a Universal Serial Bus (USB) drive, a solid-state drive (SSD), or a combination of two or more of these. The memory may include removable or non-removable (or fixed) media, where appropriate. The memory may be internal or external to the computing system 12, where appropriate. In particular embodiments, the memory is non-volatile, solid-state memory.

The user interface includes hardware, software, or both providing one or more interfaces for user communication with the computing system 12. As an example, and not by way of limitation, the user interface may include a keyboard, keypad, microphone, monitor, mouse, printer, scanner, speaker, still camera, stylus, tablet, touchscreen, trackball, video camera, another user interface or a combination of two or more of these.

The communication interface includes hardware, software, or both providing one or more interfaces for communication (e.g., packet-based communication) between the computing system 12 and other computing systems over one or more networks. As an example, and not by way of limitation, the computing system 12 may include a communication interface including a wireless NIC (WNIC) or wireless adapter for communicating through the wireless network, such as a WI-FI network. This disclosure contemplates any suitable network and any suitable communication interface. As an example, and not by way of limitation, the computing system 12 may communicate via an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the computing system 12 may communicate via a wireless PAN (WPAN) (e.g., a BLUETOOTH WPAN), a WI-FI network, a WI-MAX network, a cellular telephone network (e.g., a Global System for Mobile Communications (GSM) network), or other suitable wireless network or a combination of two or more of these. The computing system 12 may include any suitable communication interface for any of these networks, where appropriate.

In certain embodiments, the computing system 12 produces a home page 20 that shows a top list 22 of the plurality of words in an order based on the amount of times referenced. Each of the words 22a within the top list are presented with a respective number equaling the amount of times referenced, the respective live sentiment score, and a weighted score 22b. The weighted score 22b may be calculated using an algorithm 22c which averages the respective live sentiment score with the respective number of the amount of times referenced.

As illustrated in the Figures, the computing system 12 may include a smart phone 12*a* and the user interface is a display and a touchscreen. In such embodiments, the top list is displayed on the display. As mentioned above, the computing system 12 may be a desktop 12*c* or laptop in which the user interface includes a keyboard, a mouse, and a display. Additionally, the computing system may include a virtual assistant device 12*b*. In such embodiments, the user interface is a microphone and a speaker. The computing system 12 includes a voice command software that recognizes a specified command. When the specified command is recognized, the speaker plays the top list 22*b*, including each word's number and sentiment as described above.

Referring to FIGS. 3 through 7, the present invention may include a preference dashboard 30 in which the user may customize the platform. The present invention may further include a main page 40. The main page 40 may provide a top 10 word list and may further provide an overall sentiment. The overall sentiment may be calculated by averaging the live sentiment scores of all of the words. Additionally, the present invention may include a categories page 50. In such embodiments, the computing system categorizes the plurality of words from the news data and provides a plurality of selectable categories on the display. When selected, the plurality of words within the category are displayed 60 each with the respective number equaling the amount of times referenced and the respective live sentiment score. The present invention may be categorized using taxonomy tagging and thereby may include subcategories which are displayed 70.

Example Calculation Results: The Situation in the World is 2% Positive and the Top Buzz Word Today is "Vacation 12 mentions, with neutral sentiment, in 411 #All headlines, containing 3,518 words, on Sunday, Aug. 6, 2017. #Channels include Politics, Sports, Technology, Business, CNN, Fox, and more. Result is delivered through the Web site interface at https://buzzwords.news as well as through the Buzzwords.news Amazon Alexa Skill by invoking the utterance "Alexa ask Buzz Words".

It should be understood, of course, that the foregoing relates to exemplary embodiments of the invention and that modifications may be made without departing from the spirit and scope of the invention as set forth in the following claims.

What is claimed is:

1. A system of providing news analysis comprising:
 a computing system comprising a processor, a memory, a user interface, a communications interface, and word data stored on the memory, the word data comprising a plurality of words each comprising a sentiment score, wherein an artificial intelligence (AI) processor:
  retrieves news data comprising a plurality of article titles from a plurality of information sources over a network via the communications interface and summarizes the news data by;
  tallying an amount of times that each of the plurality words are referenced within the news data;
  calculating a live sentiment score of each of the words by averaging the sentiment score of a respective word with the sentiment scores of other of the plurality of words within a same sentence;
  presenting at least one of the plurality of words comprising a highest number of the amount of times referenced, wherein the at least one of the plurality of words is presented with a respective live sentiment score;
  presenting a top list of the plurality of words in an order based on the amount of times referenced, wherein each of the words within the top list are presented with a respective number equaling the amount of times referenced and the respective live sentiment score;
  calculating an average of the live sentiment scores of the plurality of words; and
  presenting the average.

2. The system of claim 1, wherein the user interface is a microphone and a speaker, wherein the computing system comprises a voice command software that recognizes a specified command wherein, when the specified command is recognized, the speaker plays the top list.

3. The system of claim 2 wherein the user interface further comprises AMAZON ECHO™, FIRE™, or DOT™, and the specified command further comprises the utterance "Alexa, ask Buzz Words".

4. The system of claim 1, wherein the user interface is a display and at least one of a keyboard, a mouse, and a touchscreen, wherein the top list is displayed on the display.

5. The system of claim 4, wherein a natural language processor (NLP):
 categorizes the plurality of words from the news data; and
 provides a plurality of selectable categories on the display, wherein when selected, the plurality of words within the category are displayed each with the respective number equaling the amount of times referenced and the respective live sentiment score.

6. The system of claim 4 wherein the top list is displayed on the display at https://buzzwords.news.

7. The system of claim 1, wherein the NLP processor of the AI:
 calculates an impact score of each of the plurality of words by averaging a respective live sentiment score with a respective number equaling the amount of times referenced.

8. A method of providing news analysis comprising steps of:
 retrieving, via an Artificial Intelligence (AI) running on a computing system, news data comprising a plurality of article titles from a plurality of information sources over a network;
 summarizing the news data, via the AI, by,
 tallying, via the AI running on the computing system, an amount of times that each of a plurality words are referenced within the news data;
 calculating, via the AI running on the computing system, a live sentiment score of each of the plurality words by:
  accessing word data comprising a plurality of words each comprising a sentiment score, and
  averaging the sentiment score of a respective word with the sentiment scores of other of the plurality of words within a same sentence;
 presenting, via software running on the computing system, at least one of the plurality of words comprising a highest number of the amount of times referenced, wherein the at least one of the plurality of words is presented with a respective live sentiment score;
 presenting, via software running on the computing system, a top list of the plurality of words in an order based on the amount of times referenced, wherein each of the words within the top list are presented with a respective number equaling the amount of times referenced and the respective live sentiment score; and calculating, via software running on the computing system, an average of the live sentiment scores of the plurality of words; and presenting, via software running on the computing system the average.

9. The method of claim 8, wherein the step of presenting comprises:

recognizing, via the software running on the computer, a voice command by a microphone; and activating, via the software running on the computing system, a speaker to present the top list.

10. The method of claim 9, wherein the voice command further comprises the utterance, "Alexa, ask Buzz Words".

11. The method of claim 8, wherein the step of presenting comprises:

displaying, via the software running on the computing system, the top list on a display.

12. The method of claim 11, further comprising steps of:

categorizing, via a natural language processor (NLP) running on the computing system, words from the news data; and presenting, via the software running on the computing system, a plurality of selectable categories on the display, wherein when selected, the plurality of words within the category are displayed with the respective number equaling the amount of times referenced and the respective live sentiment score.

13. The method of claim 11 wherein the step of displaying further comprises displaying the top list on the display at https://buzzwords.news.

14. The method of claim 8, further comprising a step of:

calculating, via the NLP running on the computing system, an impact score of each of the plurality of words by averaging a respective live sentiment score with a respective number equaling the amount of times referenced.

15. The method of claim 8, wherein the news data is an entire article corresponding to the plurality of article titles retrieved from the plurality of information sources, wherein the same sentence is the title in which the word is extracted from.

* * * * *